US008211299B2

(12) United States Patent
Lee

(10) Patent No.: US 8,211,299 B2
(45) Date of Patent: Jul. 3, 2012

(54) APPARATUS FOR REMOVING IRON POWDER FROM ROLLING OIL

(75) Inventor: Heui-Sung Lee, Incheon-shi (KR)

(73) Assignee: Buhmwoo Eco Engineering Co., Ltd., Seoul (KR)

( * ) Notice: Subject to any disclaimer, the term of this patent is extended or adjusted under 35 U.S.C. 154(b) by 400 days.

(21) Appl. No.: 12/356,014

(22) Filed: Jan. 19, 2009

(65) Prior Publication Data

US 2009/0188848 A1 Jul. 30, 2009

(30) Foreign Application Priority Data

Jan. 21, 2008 (KR) ........................ 10-2008-0006330

(51) Int. Cl.
*B01D 21/18* (2006.01)

(52) U.S. Cl. ................... 210/167.03; 210/222; 210/223; 210/298; 210/396

(58) Field of Classification Search .................. 210/222, 210/223, 695, 167.03, 298, 396; 209/229, 209/232, 217, 219, 230
See application file for complete search history.

(56) References Cited

U.S. PATENT DOCUMENTS

| | | | | |
|---|---|---|---|---|
| 2,471,044 | A * | 5/1949 | Scrivener | 210/222 |
| 3,428,179 | A * | 2/1969 | Boyd, Jr. et al. | 210/222 |
| 4,394,264 | A * | 7/1983 | Schimion et al. | 210/222 |
| 5,938,935 | A * | 8/1999 | Schimion | 210/695 |
| 6,099,739 | A * | 8/2000 | Kobayashi | 210/695 |
| 6,355,176 | B1 * | 3/2002 | Schaaf et al. | 210/695 |

FOREIGN PATENT DOCUMENTS

| | | | |
|---|---|---|---|
| JP | 56158210 | A | 12/1981 |
| JP | 10137627 | A1 | 5/1998 |
| JP | 2000-189834 | | 7/2000 |
| JP | 2004-016938 | | 1/2004 |
| JP | 2006-102625 | | 4/2006 |
| JP | 2009-090408 | | 4/2009 |
| KR | 1019950002860 | A | 2/1995 |
| KR | 200159526 | Y1 | 7/1999 |

OTHER PUBLICATIONS

English langague abstract of JP10137627, 1 page.
English language abstract of JP 56158210, 1 page.
English language abstract of KR 1019950002860A, 1 page.
English language abstract of KR 2000159526Y1, 1 page.

(Continued)

*Primary Examiner* — Tony G Soohoo
*Assistant Examiner* — David C Mellon
(74) *Attorney, Agent, or Firm* — Howard & Howard Attorneys PLLC

(57) ABSTRACT

An apparatus is disclosed for removing iron powder from rolling oil used in a rolling mill has less trouble and ensures easy maintenance and long lifetime as well as improved workability. Each part combined to the apparatus can be moved and worked individually so as to facilitate repair while enhancing the effect of removing iron powder from the rolling oil. The apparatus includes a magnetic unit that is vertically supported on a frame and moved up and down by elevating means to be located inside or above the oil tank, and a scraper unit disposed at one side of the frame so as to be transverse to the magnetic unit. The scraper unit includes a scraper separating iron powder from the surface of the magnetic unit, and a chute positioned under the scraper to collect and convey iron powder.

6 Claims, 8 Drawing Sheets

OTHER PUBLICATIONS

Japanese Publication No. JP2000-189834; English language Abstract of Japanese Publication No. JP2000-189834 from the Japanese Patent Office; 7 pages.

Japanese Publication No. JP2004-016938; English language Abstract of Japanese Publication No. JP2004-016938 from the Japanese Patent Office; 13 pages.

Japanese Publication No. JP2006-102625; English language Abstract of Japanese Publication No. JP2006-102625 from the Japanese Patent Office; 23 pages.

Japanese Publication No. JP2009-090408; English language Abstract of Japanese Publication No. JP2009-090408 from the Japanese Patent Office; 14 pages.

* cited by examiner (A)

(B)

APPARATUS FOR REMOVING IRON POWDER FROM ROLLING OIL

CROSS REFERENCE TO RELATED APPLICATION

The subject patent application claims priority to and all the benefits of Korean Patent Application No. 10-2008-0006330, which was filed on Jan. 21, 2008 with the Korea Industrial Property Office.

BACKGROUND OF THE INVENTION

1. Field of the Invention

The present invention relates to an apparatus for removing iron powder from rolling oil and, more particularly, to an improved apparatus for removing iron powder from rolling oil, which can reduce troubles and facilitate maintenance with a simple construction while greatly improving efficiency in separation of iron powder, which can cause serious defects to the quality of products and concerned facilities.

2. Description of the Prior Art

In general, cold-rolled steel sheets with a uniform thickness and a smooth surface are used for bodies of automobiles, measuring devices, electrical appliances, and the like. Such cold-rolled steel sheets are produced by acid-pickling and rolling hot-rolled steel plates through rolls of a cold rolling mill. In this manufacturing process, rolling oil is used for cooling, lubricating and rust-protecting of the rolls of the rolling mill. Since the rolling oil is pumped from a rolling oil tank and repeatedly used, the rolling oil returning to the rolling oil tank contains fine iron powder, which is generated during rolling. When the iron powder is introduced and accumulated in the oil tank, it contaminates the rolling oil or obstructs the flow of rolling oil, thereby causing malfunction of the rolling mills or defects such as scratches on the surface of a resultant cold-rolled steel sheet. As a result, the quality of a final product is degraded.

In order to prevent the iron powder from collecting inside the oil tank, an apparatus for separating or removing the iron powder from the rolling oil has been developed. One example of the conventional apparatus will be briefly described with reference to the drawing. Referring to FIG. 1, a conventional apparatus 1 for removing iron powder includes a conveyor belt 2 extending to pass through a rolling oil tank 5, a plurality of magnets 3 disposed on the conveyor belt 2, a scraper 6 located at one side of the conveyor belt 2 to remove iron powder from the magnets 3 having passed through the rolling oil tank 5, and a collection box 7 for collecting the iron powder separated by the scraper 6. In this conventional apparatus 1, the magnets 3 on the conveyor belt 2 are polygonal or round bar-shaped or are linked with each other, and the scraper 6 is provided with a variety of configurations according to the configurations of the magnets 3 so as to separate the iron powder from the surfaces of the magnets 3.

However, in the conventional apparatus 1 using this type of conveyor belt 2 which has a unitarily-linked structure, in the event where part of the conveyor belt 2 malfunctions, inspection and repair cannot be performed until the entire apparatus is suspended, thereby causing an increase in down-time of the apparatus.

Particularly, in the event where the apparatus is stopped due to failure or for repair, since a part of the conveyor belt 2 is in a state of being immersed in the rolling oil tank 5, it is necessary to disassemble the entire apparatus for repairing the part of the conveyor belt 2 immersed in the rolling oil tank 5. However, such a disassembling operation is inconvenient, and the repair of the part of the conveyer belt 2 is very troublesome.

Furthermore, when the conveyor belt 2 is circulated from the oil tank 5 to an upper portion of the apparatus and then returned thereto, the rolling oil flowing into or being discharged from inside the conveyor belt 2 can be mixed with sludge stuck to the conveyor belt 2. Here, the sludge tends to clog the apparatus due to the structural characteristics of the apparatus, thereby causing frequent failure of the apparatus while making it difficult to clean or repair the apparatus. Moreover, since the conveyor belt 2 repeatedly passing through the oil tank 5 is vulnerable to rust resulting from contamination by the iron powder and sludge, the conventional apparatus has a short lifetime.

SUMMARY OF THE INVENTION AND ADVANTAGES

The present invention is conceived to solve the problems of the conventional techniques as described above, and an aspect of the present invention is to provide an improved apparatus for removing iron powder from rolling oil with a convenient and comparatively simple structure which entails less trouble, ensures easy maintenance, and extends lifetime.

Another aspect of the present invention is to provide an improved apparatus for removing iron powder from rolling oil, which has an increased operation rate by designing the apparatus with individually operable units to eliminate the requirement for suspending the entire apparatus.

A further aspect of the present invention is to provide an improved apparatus for removing iron powder from rolling oil, which has improved efficiency in separation of the iron powder by enlarging a separating area of the apparatus.

According to an aspect of the invention, an apparatus for removing iron powder from rolling oil includes: a frame disposed above an oil tank containing rolling oil mixed with iron powder; a panel-shaped magnetic unit vertically supported on the frame and moved up and down by elevating means to be located inside or above the oil tank, the magnetic unit having a magnetic surface to which the iron powder is attached; and a scraper unit disposed at one side of the frame so as to be transverse to the magnetic unit, the scraper unit comprising a scraper allowing the magnetic unit to pass therethrough, the scraper being brought into contact with and detached from the magnetic unit while separating the iron powder from the surface of the magnetic unit in a state of contacting the surface of the magnetic unit, and a chute disposed at one side under the scraper to collect the iron powder.

The magnetic unit may include a unit frame defining a rectangular circumference of the magnetic unit and a plurality of magnetic bars having square or round cross-section and combined with an inner portion of the unit frame in a longitudinal direction, the plurality of magnetic bars being arranged to form alternating projections and channels.

The apparatus may include a plurality of the magnetic units and a plurality of the elevating means, each of the elevating means being provided with the plurality of the elevating means to be simultaneously driven by the elevating means.

The scraper may have a plate shape rotatable by a rotating means and having a leading edge having a shape corresponding to a surface of the magnetic bar of the magnetic unit.

The apparatus may further include a sensor controlling displacement limits of the elevating means.

BRIEF DESCRIPTION OF THE DRAWINGS

The above and other aspects, features and advantages of the present invention will become apparent from the following description of a preferred embodiment given in conjunction with the accompanying drawings, in which.

DETAILED DESCRIPTION OF THE INVENTION

Exemplary embodiments of the present invention will be described in detail with reference to the accompanying drawings.

Figure 1:
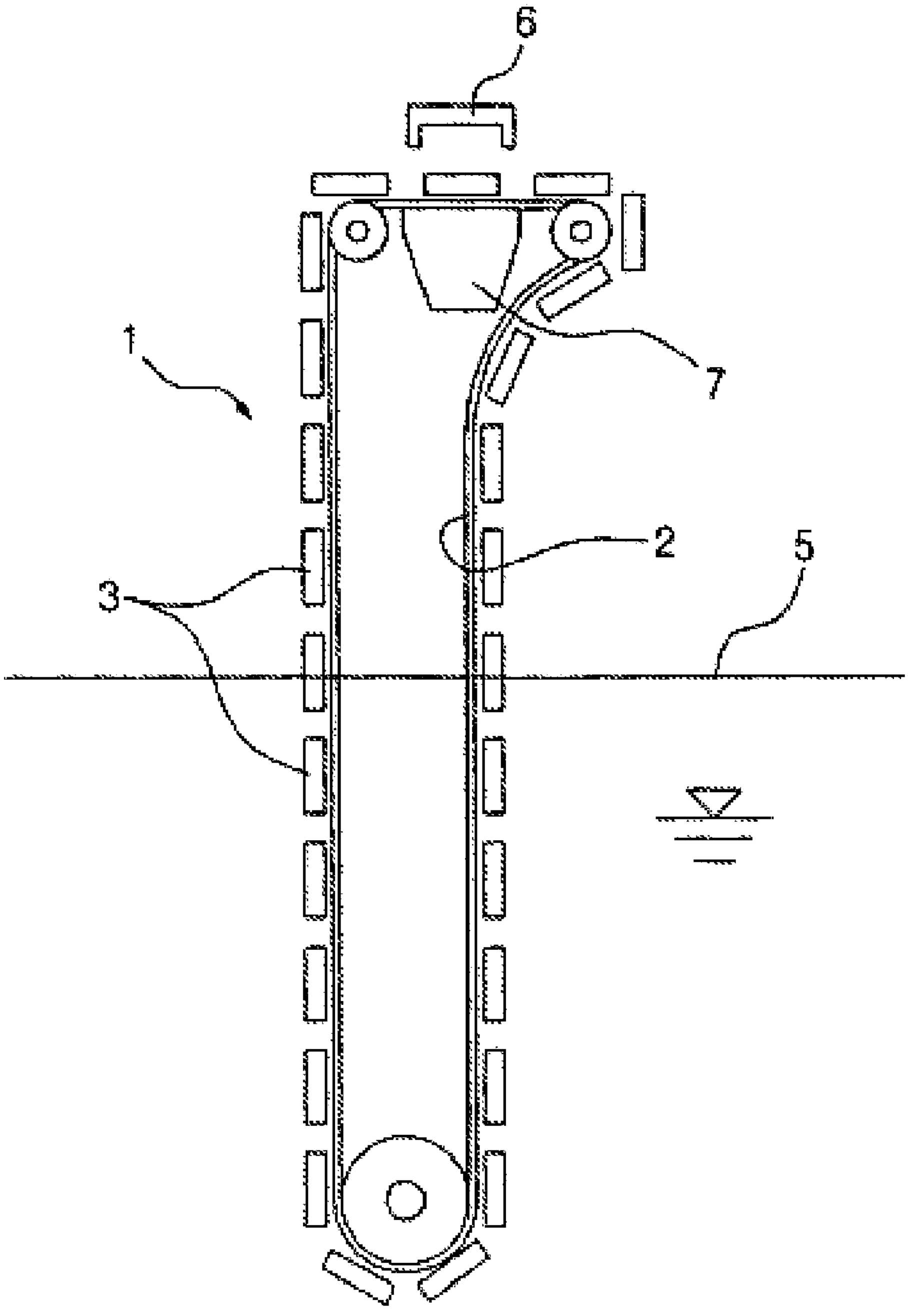
Prior Art Figure 1
FIG. 1 is a configuration view of a conventional apparatus for removing iron powder.
Figure 2:
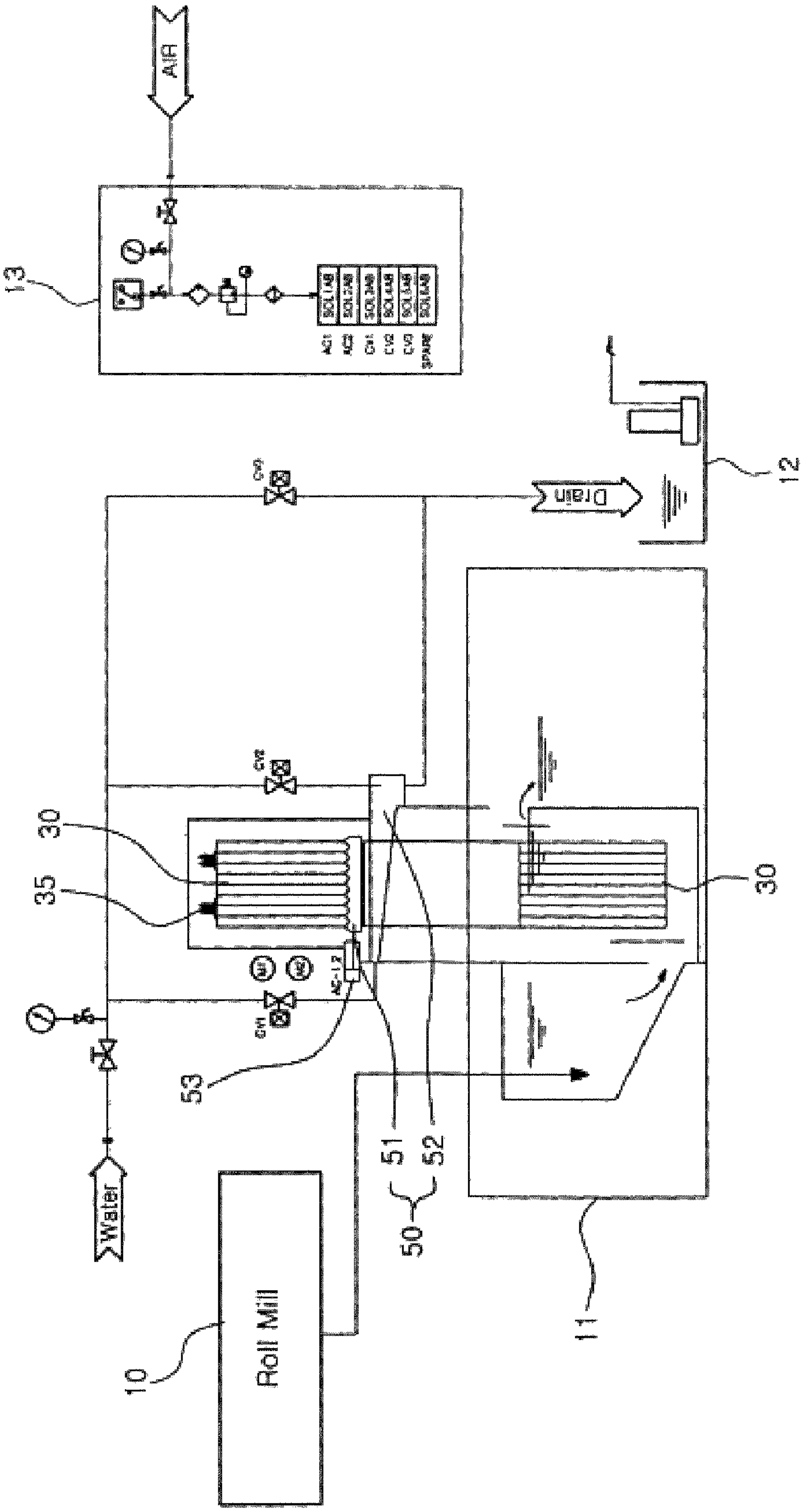
FIG. 2 is a schematic view illustrating an arrangement of an apparatus for removing iron powder from rolling oil according to an embodiment of the present invention.

FIG. 2 is a schematic view illustrating an arrangement of an apparatus for removing iron powder from rolling oil according to an embodiment of the invention. FIGS. 3 to 6 show main parts of the apparatus according to the embodiment of the present invention.

Referring to FIG. 2, the apparatus according to the embodiment of the invention is provided with an oil tank 11, which contains rolling oil mixed with iron powder discharged from a rolling mill 10 for manufacturing cold-rolled steel sheets. The apparatus includes a magnetic unit 30 disposed above the oil tank 11 to be vertically moved into and from the tank 11, and a scraper unit 50 including a scraper 51 and a chute 52. The scraper 51 is configured to allow the magnetic unit 30 to pass therethrough to separate iron powder from the surface of the magnetic unit 30.

With this configuration, the magnetic unit 30 is continuously moved up and down by an elevating means 35 while passing through the scraper unit 50, such that the scraper 51 comes into contact with the surface of the magnetic unit 30 to separate iron powder from the magnetic unit 30. Here, the separated iron powder is collected in the chute 52 disposed below the scraper 51 and is then conveyed into an iron powder accumulator 12.

In this embodiment, a manual or automatic control unit 13 is provided to operate the apparatus. The control unit 13 operates the elevating means 35 and the rotating means 53 to control the magnetic unit 30 and the scraper 51 to cooperate with each other, for example, such that the scraper 51 can come into contact with the magnetic unit 30 when the magnetic unit 30 is moved downward and can be detached from the magnetic unit 30 when the magnetic unit 30 is moved upward. Additionally, the control unit 13 may control working time of the apparatus to allow the magnetic unit 30 to temporarily stop in a raised state so as to fully discharge the rolling oil, or may control operation of an air or water supply system to optimize the operation of the apparatus.

Figure 3:
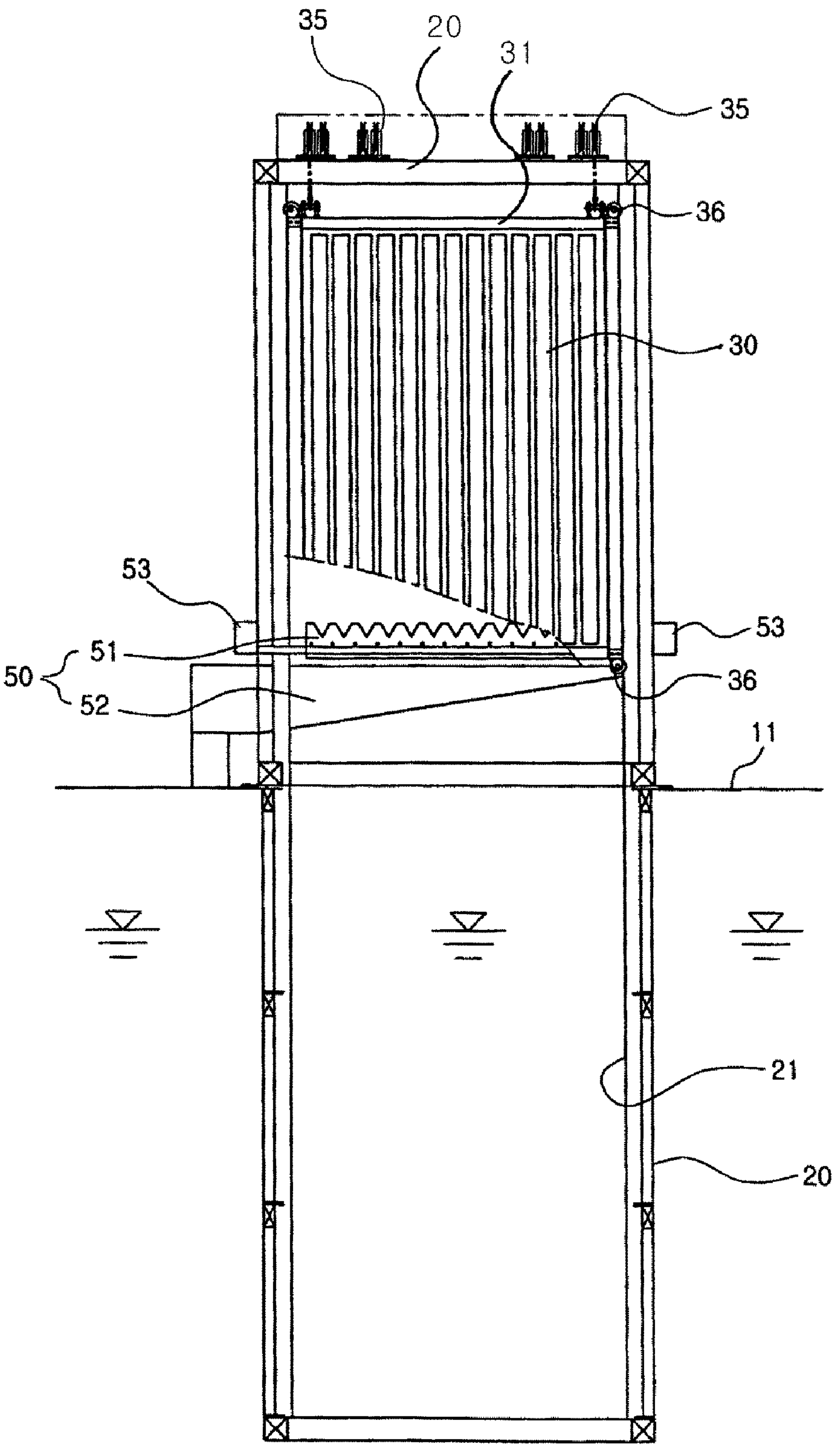
FIG. 3 is a front view of the apparatus according to the embodiment of the invention.

In more detail, as shown in FIG. 3, a frame 20 is provided above the oil tank 11 to vertically extend into the tank 11, which contains the rolling oil mixed with iron powder, and the magnetic unit 30 is provided in the vertical direction to the frame 20 to be moved up and down by the elevating means 35, which is coupled to an upper end of the magnetic unit 30. The elevating means 35 includes a chain belt, which is wound around the upper end of the frame 20 to move the magnetic unit 30 up and down. Here, the magnetic unit 30 has rollers 36 disposed on the top and bottom of both sides thereof to move slidably and stably along a guide rail 21.

The scraper unit 50 is provided at one side of the frame 20, and includes the scraper 51 disposed adjacent to an upper portion of the oil tank 11 to be transverse to the magnetic unit 30 and the chute 52 disposed at one side under the scraper 51. The scraper 51 is opened wider than the width of the magnetic unit 30 such that the magnetic unit 30 can easily pass through the scraper 50. The scraper 51 has a lower end coupled to and rotated by the rotating means 53 to allow a leading end of the scraper 51 to come into contact with and be detached from the surface of the magnetic unit 30.

Figure 4:
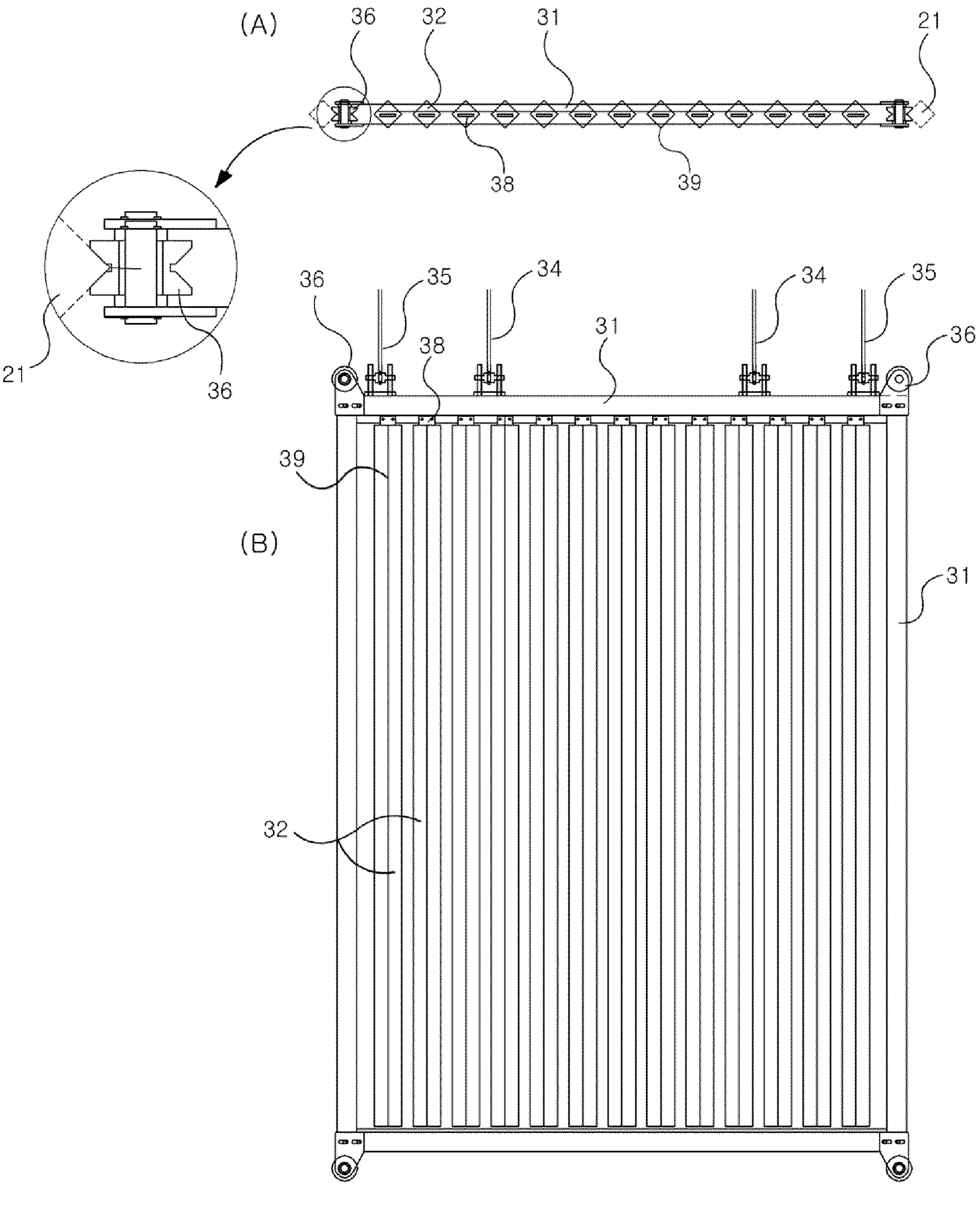
FIG. 4 is a top plan view and a front view of a main part of the apparatus according to the embodiment of the present invention.

As shown in (A) and (B) of FIG. 4, the magnetic unit 30 has a substantially panel-shape and is coupled to the elevation means 35 at an upper end of a rectangular unit frame 31 which constitutes a rim 38. The rollers 36 are located at opposite sides of the unit frame 31 and have a cone-shaped groove corresponding to the diamond-shaped guide rail 21 which is shown as a dotted a line. Inside the unit frame 31, a plurality of square or diamond shaped magnetic bars 32 are parallelly and longitudinally arranged. The magnetic bar 32 inside the unit frame 31 may be coupled to each other to be spaced from each other or be coupled to each other so as not to form an interval therebetween. Each of the magnetic bars 32 forms a projection line 39 and is suspended from the unit frame 31 via the rim 38, as shown in FIG. 4 (B). The magnetic bars 32 may have a variety of other shapes such as a round cross-section instead of the square cross-section.

The magnetic bars 32 are arranged inside the unit frame 31 to form the projection lines 39 which further facilitate flow of sludge, thereby enhancing the effect of separating the rolling oil. Even without the projection lines 39, since the magnetic unit 30 has a panel shape and extends in the vertical direction, the vertical movement of the magnetic unit 30 alone can naturally separate the rolling oil therefrom. Here, the control unit 13 can be used to set a suspension time of the magnetic unit 30. Alternatively, the magnetic unit 30 may utilize other types of magnets, which form a planar configuration, instead of the magnetic bars 32. In this case, although the effect of separating the rolling oil from the magnetic bars 32 can be decreased due to the absence of the projection lines 39, the efficiency of removing iron powder with the magnetic unit 30 can be kept substantially the same.

Specifically, the magnetic bars 32 may have a diamond shape with four corners and are spaced from each other with channels which can facilitate downward flow of the rolling oil and sludge. As described above, since the magnetic unit 30 has a panel shape and the magnetic bars 32 are vertically arrayed parallel to each other, the rolling oil can be easily discharged from the magnetic bars 32. Other types of magnets may also be used instead of the magnetic bars 32. Available examples thereof include a permanent magnet or an electric magnet.

Figure 5:
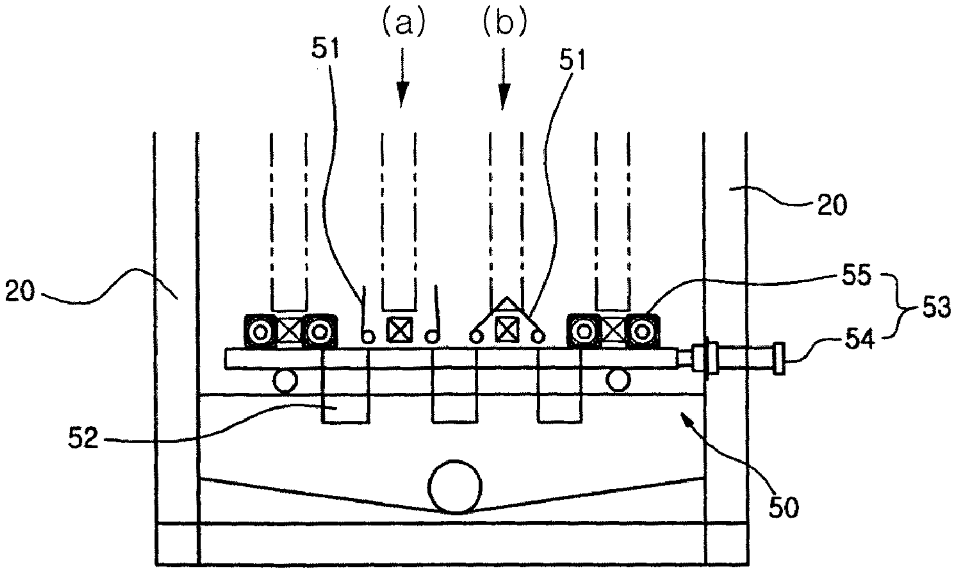
FIG. 5 is a side elevation view of a main part of another component of the apparatus according to the embodiment of the present invention.
Figure 6:
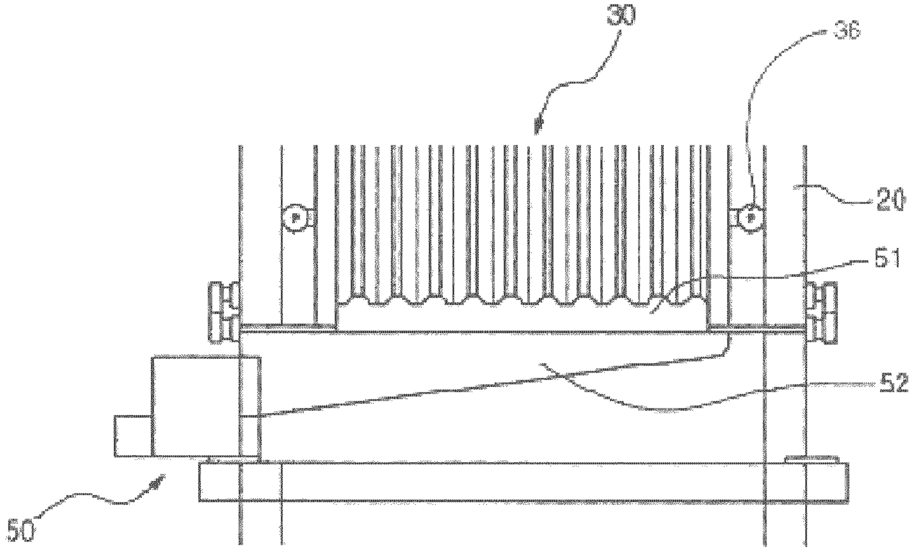
FIG. 6 is a front view of the main part of the component of the apparatus.

On the other hand, referring to FIGS. 5 and 6, the scraper unit 50 is disposed on the frame 20 so as to allow the magnetic unit 30 to pass through the scraper unit 50. In the scraper unit 50, the rotating means 53 includes an air cylinder 54 and drive gears 55, and is coupled to the lower end of the scraper 51, under which the chute 52 is disposed to collect and covey the iron powder.

Figure 8:
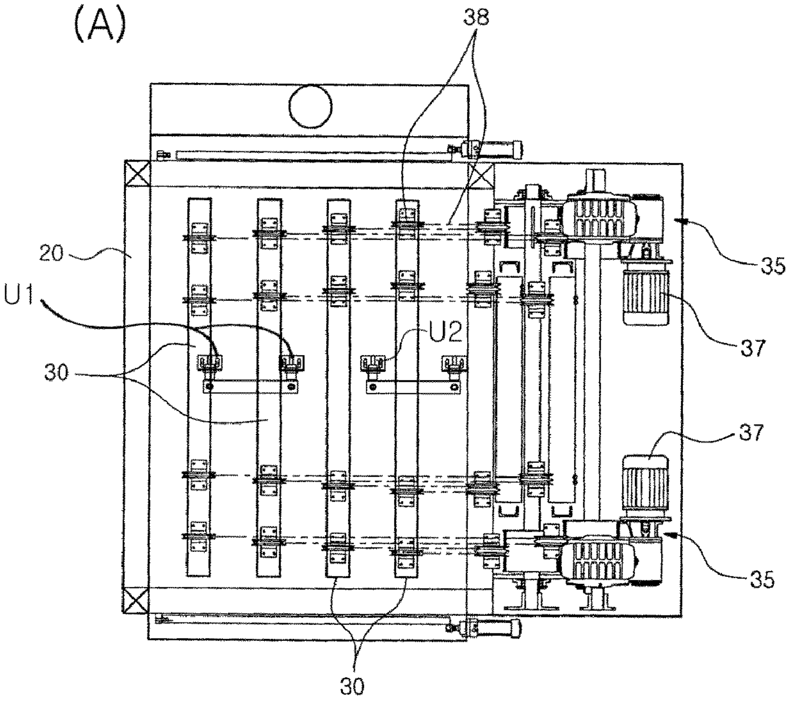
FIG. 8 is a top plan view of the apparatus of FIG. 7, and a picture of a sensor.
Figure 8:
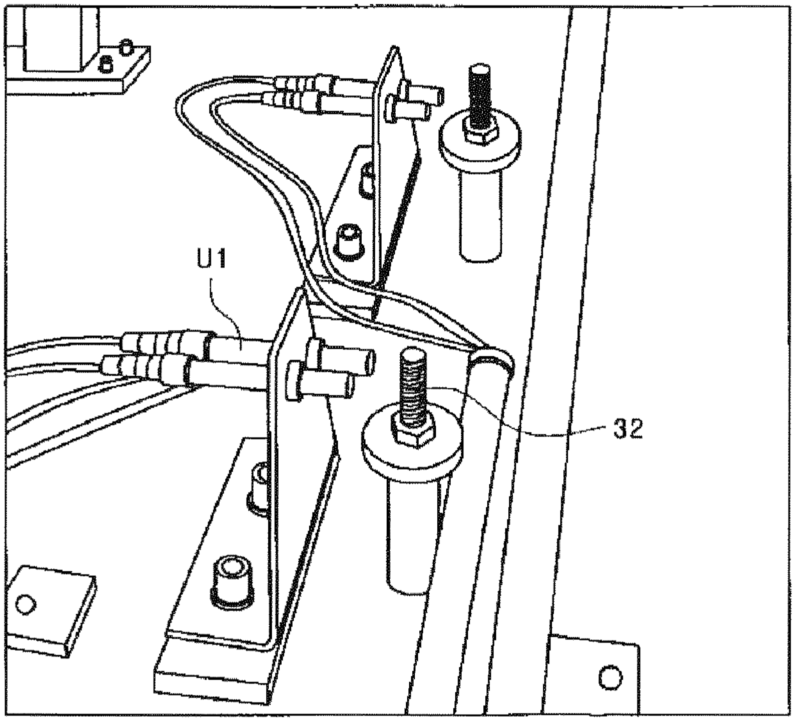
Figure 9:
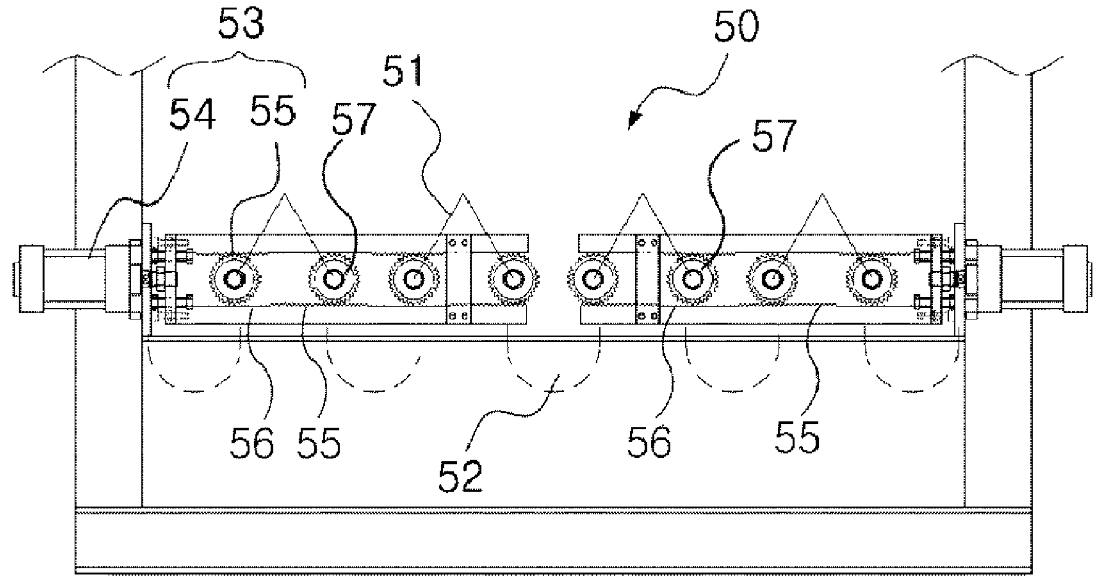
FIG. 9 shows a scrapper unit of an apparatus for removing iron powder from rolling oil according to an exemplary embodiment of the present invention.

With this construction, the scraper 51 is rotated to allow the leading end of the scraper 51 to come into contact with or to be detached from both sides of the magnetic unit 30. The leading end of the scraper 51 has a wedge shape corresponding to the shape of the magnetic bars 32. The bottom of the chute 52 is inclined in one direction to efficiently discharge the iron powder. Referring to FIGS. 5 and 7 to 9, a mechanism for opening/closing the scraper is shown. The scraper 51 is open in FIG. 5 (*a*) and is closed in FIG. 5 (*b*). For opening or closing the scraper 51, two pinions 57 are provided to move face to face on a rack 55. The pinion 55 is not advanced to a non-racked portion 56. As shown in FIG. 9, to open the scraper 51, the two pinions 57 are moved in opposite directions on the rack 55.

Figure 7:
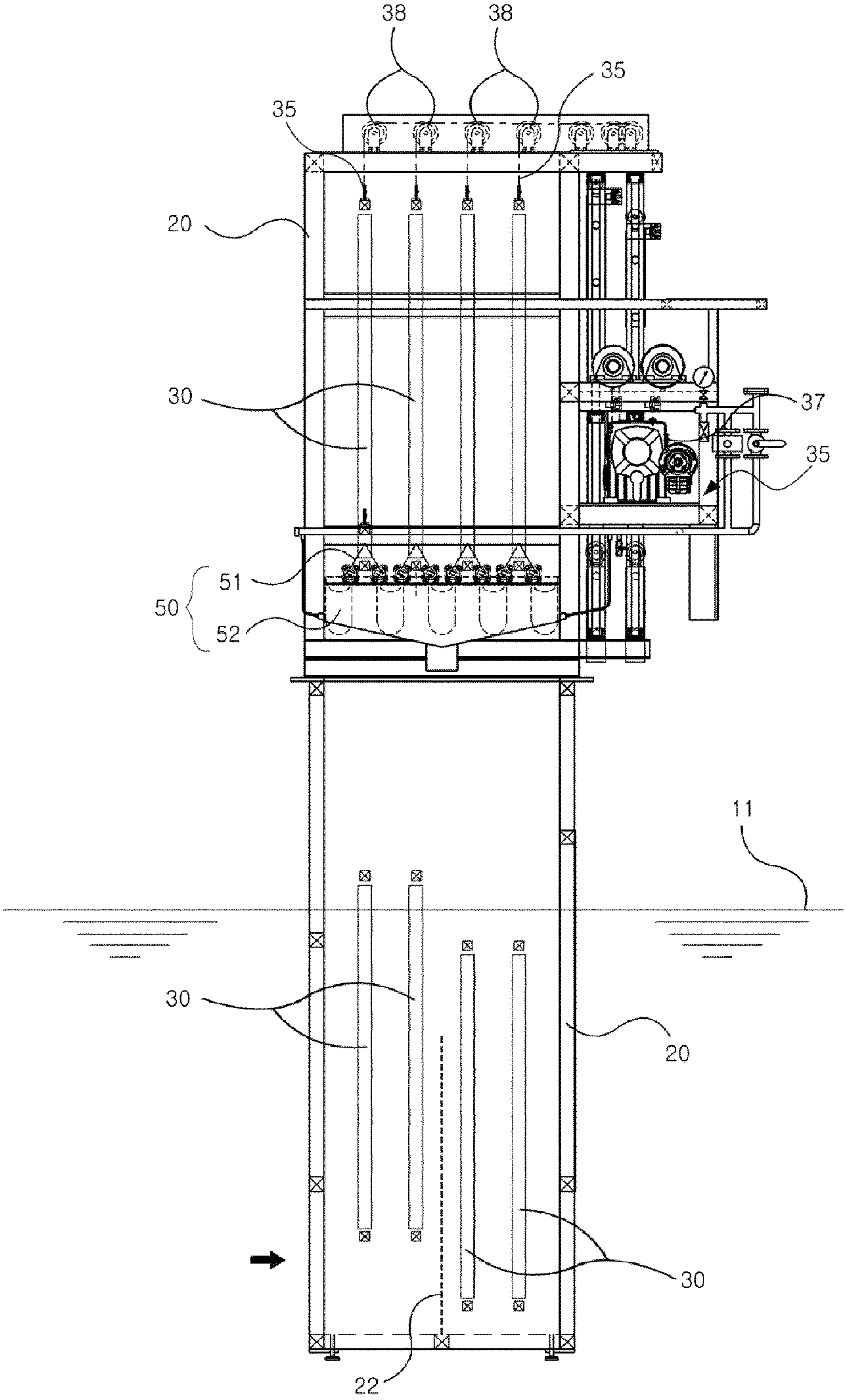
FIG. 7 is a side elevation view of an apparatus for removing iron powder from rolling oil according to another embodiment of the present invention.

Referring to FIGS. 6 and 7, an apparatus for removing iron powder from rolling oil according to another embodiment of the invention includes a plurality of magnetic units 30 and a plurality of elevating means 35. In this embodiment, the magnetic units 30 are grouped such that each group of the magnetic units 30 can be simultaneously driven by each of the elevating means 35. With this construction, each group of the magnetic units 30 can be individually operated by each of the elevating means 35. Thus, the apparatus can be partially repaired or inspected, as needed, without stopping or suspending the entire line even during operation of the apparatus, thereby achieving an effect of remarkably reducing down-time of the apparatus. As shown in FIG. 8, the upper limit of the raising the magnetic bars can be checked using the stroke of the magnetic bars by optical sensors (U1, U2, U3, . . . ). FIG. 8 (B) is a photograph showing a sensor and the upper part of a bar.

Further, the groups of the magnetic units 30 can be sequentially or alternately immersed in the oil tank 11 by the elevating means 35 to generate an active flow of rolling oil in the oil tank 11, thereby increasing efficiency of attaching the iron powder to the surface of the magnetic units 30 in the rolling oil. In addition, partitions 22 may be provided to increase efficiency of attracting the iron powder to the surfaces of the magnetic units. The sequential or alternating immersion of the magnetic units 30 allows relatively fine iron powder to be easily magnetized to form clumps which readily stick to the magnetic units 30, so that the iron powder can be more reliably removed.

Reference numeral 37 indicates a drive motor, and reference numerals 38 indicate a winding means including a chain and a winding roll which are driven by the drive motor 37. The elevating means 35 may be substituted by or modified into various forms.

As apparent from the above description, in the apparatus for removing iron powder from rolling oil according to an embodiment of the present invention, a magnetic unit is moved into and out of a rolling oil tank to allow iron powder to be attached to both surfaces of the magnetic unit while suspending from a frame of the apparatus, and a scraper unit includes a scraper and a chute, in which the scraper allows the magnetic unit to pass therethrough and can remove the iron powder from both surfaces of the magnetic unit. Thus, the magnetic unit has a broad surface area for attracting the iron powder, thereby providing a remarkably increased effect in removal of iron powder from rolling oil. Additionally, the iron powder can be continuously removed from the rolling oil by operation of the scraper that is controlled to come into contact or to be detached from the surfaces of the magnetic unit in cooperation with upward and downward movement of the magnetic unit without any suspension or discontinuation of the apparatus, thereby greatly improving working efficiency.

Further, according to an embodiment of the invention, the magnetic unit is arranged in a vertical direction and moved into and out of the oil tank to thereby allow rolling oil containing sludge to be easily discharged from the magnetic unit, and has a simple configuration that can substantially prevent the sludge from damaging the apparatus. Accordingly, the apparatus can be easily cleaned and repaired, such that lifespan thereof can be noticeably extended.

Further, according to an embodiment of the invention, the magnetic unit includes a plurality of magnetic bars that have a square or round cross-section and are arrayed in the longitudinal direction to form projective lines on opposite sides of the magnetic unit, such that when rolling oil is discharged from the magnetic unit, sludge can flow through grooves defined by the projective lines (or channels defined between the magnetic bars), thereby further improving the effect of discharging the rolling oil.

Further, according to an embodiment of the invention, groups of magnetic units can be moved up and down individually by respective associated elevating means to allow the apparatus to be partially inspected and repaired during operation of the apparatus without suspension of the entire apparatus, thereby reducing down-time of the apparatus.

Further, according to an embodiment of the invention, the groups of magnetic units can be sequentially or alternately immersed in the oil tank to form an active flow of the rolling oil inside the oil tank, thereby allowing the iron powder contained in the rolling oil to be easily attached to the magnetic units. Furthermore, such sequential or alternating immersion of the magnetic units allows relatively fine iron powder to be easily magnetized to form clumps, so that the iron power can be more reliably removed.

Moreover, since the scraper has a plate shape capable of being rotated by a rotating means and allows only the leading end of the scraper to come into contact with or to be detached from the magnetic unit, it is possible to ensure a greater space by rotating the scraper when cleaning or inspecting the scraper unit. Advantageously, this can facilitate cleaning or repair of the apparatus as well as decrease failure thereof.

While the present invention has been shown and described with respect to the exemplary embodiments, it will be understood by those skilled in the art that various substitutions and modifications may be made without departing from the spirit and scope of the invention as defined in the following claims.

What is claimed is:

1. An apparatus for removing iron powder from rolling oil, comprising:

a frame disposed above an oil tank containing rolling oil mixed with iron powder;

a panel-shaped magnetic unit vertically supported on the frame and moved up and down by elevating means to be located inside or above the oil tank, the magnetic unit having a magnetic surface to which the iron powder is attached; and a scraper unit disposed at one side of the frame so as to be transverse to the magnetic unit, the scraper unit comprising a scraper allowing the magnetic unit to pass therethrough, the scraper being brought into contact with and detached from the magnetic unit while separating the iron powder from the surface of the magnetic unit in a state of contacting the surface of the magnetic unit, and a chute disposed under the scraper to collect the iron powder, wherein the magnetic unit comprises a unit frame defining a circumference of the magnetic unit and a plurality of magnetic bars are in parallel and longitudinally arranged inside the unit frame, wherein the apparatus comprises a control unit, and the control unit is configured such that the scraper can come into contact with the magnetic unit when the magnetic unit is moved downward, and the scraper can be detached from the magnetic unit when the magnetic unit is moved upward, and the magnetic unit temporarily stops in a raised state.

2. The apparatus according to claim 1, wherein each of the magnetic bars has a square or round cross-section.

3. The apparatus according to claim 1, wherein each of the magnetic bars has a diamond shape, and the plurality of magnetic bars form alternating projections and channels between the magnetic bars to facilitate downward flow of the rolling oil.

4. The apparatus according to claim 3, wherein the apparatus comprises a plurality of the magnetic units and a plurality of the elevating means, each of the elevating means being coupled to a predetermined group of the magnetic units to drive the predetermined group of the magnetic units simultaneously.

5. The apparatus according to claim 3, wherein the scraper is rotatable by a rotating means and has a leading end having a shape corresponding to a surface of the magnetic bar of the magnetic unit.

6. The apparatus according to claim 3, further comprising a sensor controlling a displacement limit of the elevating means.

* * * * *